Figure 1:
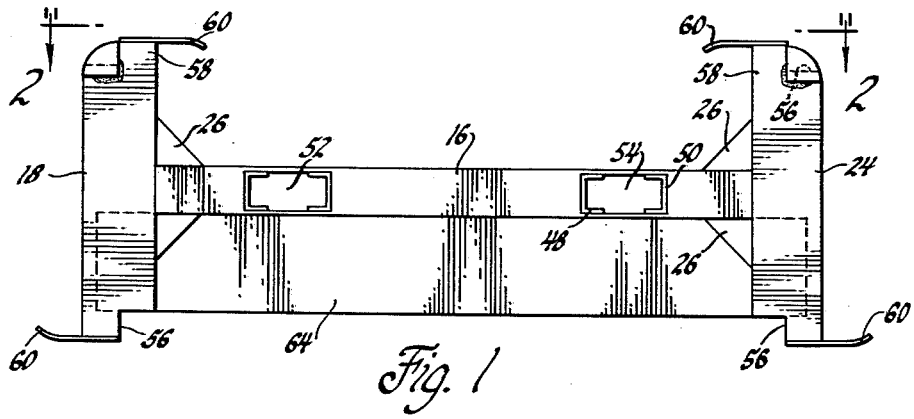

Oct. 2, 1962       E. S. HARRIS ETAL       3,056,526
DUAL PURPOSE SHIPPING RACK
Filed April 19, 1960                2 Sheets-Sheet 1

INVENTORS
Ernest S. Harris &
BY Ralph F. Beck
C. P. Barnard
ATTORNEY

Oct. 2, 1962   E. S. HARRIS ETAL   3,056,526
DUAL PURPOSE SHIPPING RACK
Filed April 19, 1960   2 Sheets-Sheet 2

INVENTORS
Ernest S. Harris &
BY  Ralph F. Beck

C. P. Barnard
ATTORNEY

United States Patent Office 3,056,526
Patented Oct. 2, 1962

3,056,526
DUAL PURPOSE SHIPPING RACK
Ernest S. Harris and Ralph F. Beck, Detroit, Mich., assignors to General Motors Corporation, Detroit, Mich., a corporation of Delaware
Filed Apr. 19, 1960, Ser. No. 23,174
7 Claims. (Cl. 220—97)

This invention relates to material handling equipment and more particularly to equipment designed for transporting and storing diverse materials for industrial applications. The embodiments of the invention herein described are also well suited to inter-factory shipments of various industrial materials.

The efficient handling of materials has been a problem in manufacturing plants for many years. In many manufacturing organizations unfinished articles of various descriptions are repeatedly carried from one building to another building where the physical characteristics of the articles are changed and then the articles are returned to the original building. Often the change in physical characteristics renders the original carrying device unsuitable for the return trip. In many other instances a particular type of article is carried from one place to another and returned empty even though other articles must be carried, reversely, from the second place to the first because the carrying device is unsuitable for both articles. The previous practice of carrying of diverse articles has been to provide a different type rack or shipping pallet for each article and, consequently, considerable expense has occurred in securing sufficient numbers of the racks or pallets to accommodate the various parts carried between work stations. In addition, many years of experience with various types of material handling apparatus have illustrated that compact stackable shipping containers are most desirable. We have ascertained that there is considerable economy in providing material handling equipment which is capable of carrying diverse articles and is adaptable to random stacking with a minimum limitation of stacking positions.

The objects of this invention are, therefore, to provide a novel parts receptacle or container that may be easily and safely handled by a conventional fork lift truck; to provide material handling equipment which may be loaded and moved from place to place more quickly and conveniently than possible with other types of equipment; to provide a shipping rack or pallet adapted to accommodate diverse factory materials; to provide a pallet or shipping rack that may be randomly stacked; to provide a novel interlock arrangement for stacking material handling racks in a rigid condition; and to provide support means of sturdy construction and facilitating movement of the racks.

The foregoing objects are accomplished, according to the present invention, by the provision of a material handling rack, by providing post-type supports for a centrally located rack platform that is provided with fork tunnels extending inwardly from the periphery of the rack on all sides thereof, and by providing alternate interlocking means on the corners of the post members so that the racks may be stacked in random fashion. In addition, the central body portion of the rack is provided with means to accommodate diverse materials on opposite sides thereof so that the rack may be used to handle a plurality of diverse articles.

Figure 2:
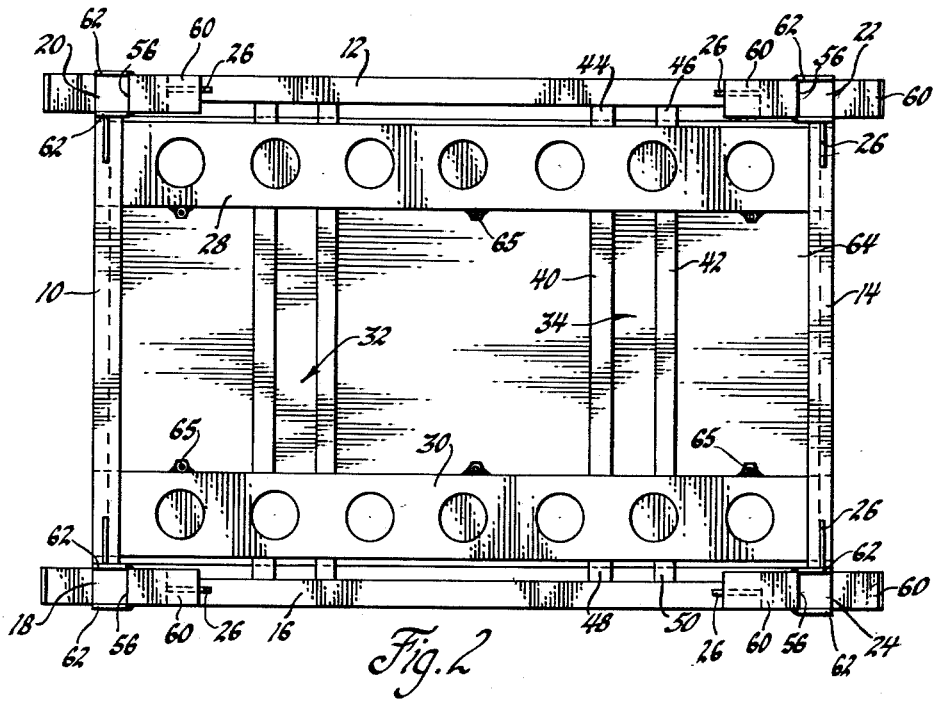
Figure 3:
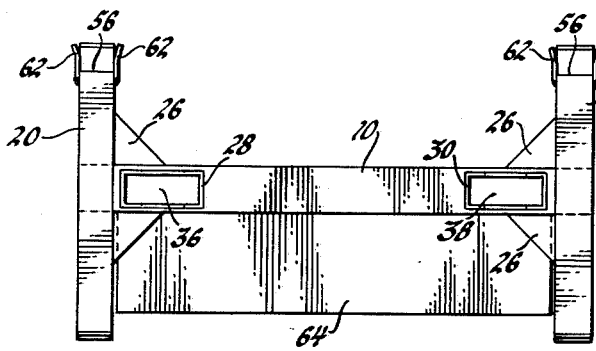
Figure 4:
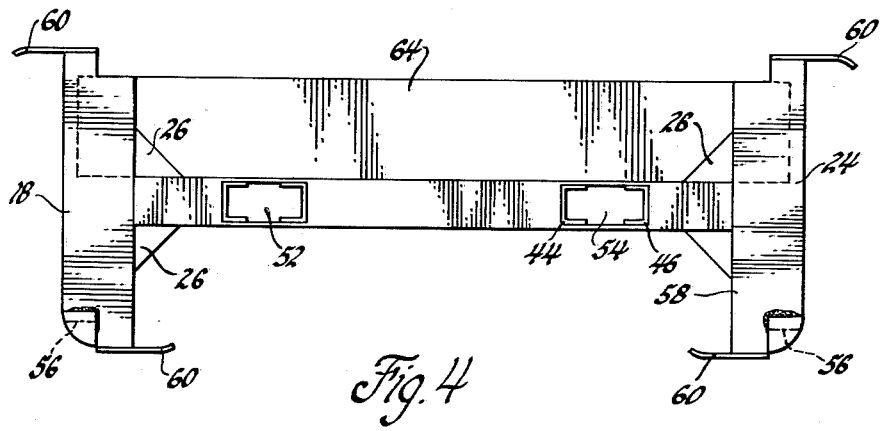
Figure 5:
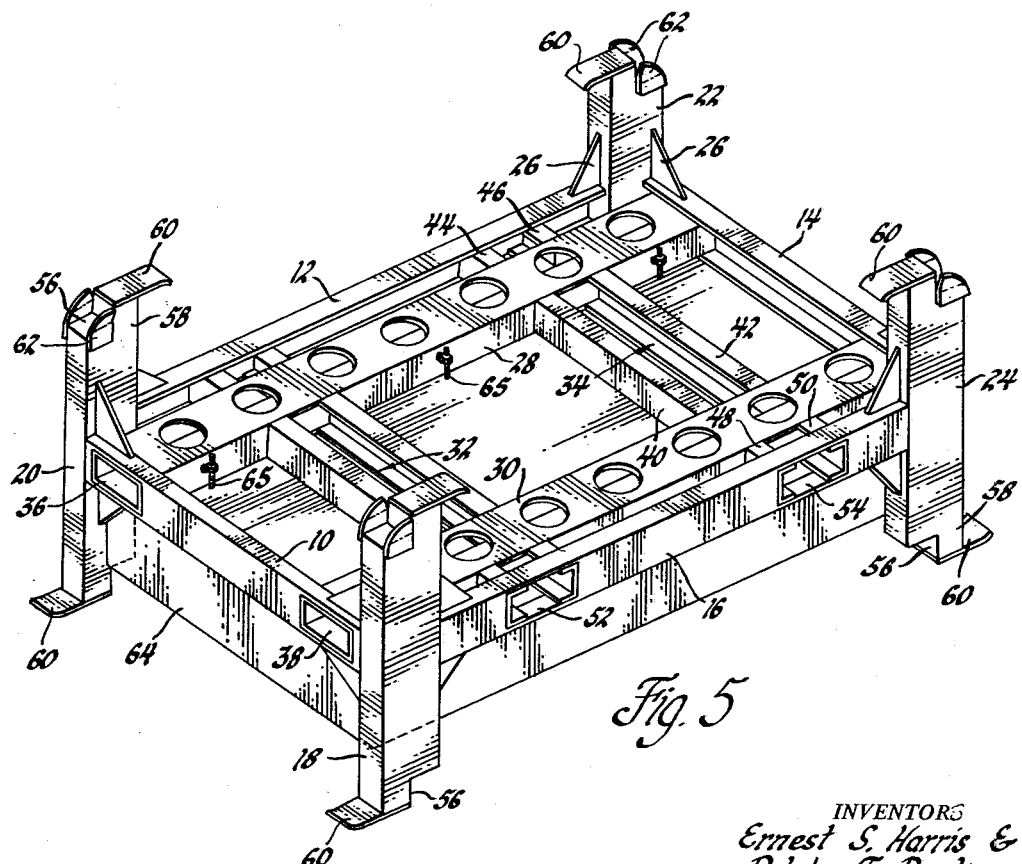

Other objects and advantages will become apparent from the following detail description in which reference is made to the accompanying drawings wherein:

FIGURE 1 is a side elevational view of an illustrative embodiment of the invention;
FIGURE 2 is a top view taken along the line 2—2 in FIGURE 1;
FIGURE 3 is an end view of the device shown in FIGURE 1;
FIGURE 4 is a side elevational view of the device in FIGURE 1 with the top and bottom reversed; and
FIGURE 5 is a perspective view of the device shown in FIGURE 1.

Referring now to the drawings, the illustrated shipping rack comprises, in general, a rim portion, a central support and fork tunnel portion, and a plurality of support legs. Although the preferred rim portion is shown to be rectangular in shape, other polygonal shapes could be used in many applications. The rim portion is formed by channel rim members 10, 12, 14, 16 having outwardly facing web portions and being fixedly secured between support legs 18, 20, 22, 24. The channel rim members are suitably secured to the support legs intermediate the ends thereof and may be additionally supported by a plurality of gusset plates 26. A pair of fork tunnels 28, 30 extend between the channel rim members 10, 14. A pair of transverse fork tunnels 32, 34 intersect the fork tunnels 28, 30 and extend between the channel rim members 12, 16. The tunnels 28, 30 are formed by hollow rectangular structural members which are supported by the channel rim members 10, 14 and extend therethrough to form fork ports 36, 38 in each channel member. The transverse fork tunnel 34 is formed by oppositely facing channel tunnel members 40, 42 which extend between aligned openings in the tunnel members 28, 30. Additional oppositely facing channel tunnel members 44, 46 and 48, 50 extend between aligned openings in the channel rim members 12, 16 and the tunnel members 28, 30 to form a continuous transverse tunnel. The transverse tunnel member 32 is formed similarly to the transverse tunnel member 34 and fork ports 52, 54 are formed in both of the channel rim members 12, 16.

To provide for random stacking of the shipping rack on other similar racks and to facilitate easy handling of the apparatus, the support legs 18, 20, 22, 24 are specially formed with stacking notches 56 and stacking lugs 58 on both ends. In addition, both ends of the leg members are provided with shoe or skid members 60 that are fastened directly to the end surfaces of the stacking lugs 58 and lateral support plates 62 partially enclose the notches 56. The opposite ends of each post are provided with reversely positioned stacking notches and stacking lugs so that corresponding shipping racks may be vertically stacked with a particular side of the rack up and so that any rack may be turned end for end without interfering with the stacking thereof. The longitudinal axes of the rectangular racks must always be parallel and, therefore, a rack can be stacked in either of two positions. Such an arrangement is satisfactory when all of the racks to be stacked are supporting materials on the same side of the respective racks. In those instances where diverse materials are being carried on opposite sides of the racks to be stacked, and consequently, a bottom side might have to be stacked on a bottom side rather than on a top side as illustrated; the arrangement of stacking notches and lugs may be varied so that adjacent ends of the legs on the same side of the rack are provided with oppositely formed stacking notches and stacking lugs. For example, if the position of the stacking means at the top of the legs 18 and 24, in FIGURE 5, were reversed (in effect turned 180°) so that the position of the stacking means on the top of leg 18 corresponded to the position of the stacking means on the top of leg 22 and the stacking means on the top of leg 24 corresponded to the position of the stacking means on the top of leg 20; the adjacent ends of the legs on the upper side of the rack would be oppositely formed. That is, the stacking means on the top of legs 18 and 22, which are adjacent legs to the legs 20 and 24, are oppositely formed relative to the stacking means on the top of legs 20 and 24. If the bottom stacking means are similarly formed relative to one another and the stacking means on each end of the legs are oppositely formed, similar racks may be randomly stacked; top to bottom, top to top, or bottom to bottom. If a rack having equal length sides, such as a square-shaped rack, were used; the stacking means at each corner may be turned 90° relative to adjacent stacking means so that each stacked rack may be located in four positions relative to its support rack regardless of the relative positions of top and bottom sides of the rack. In this manner any side of any of a number of pallets can be easily positioned for stacking engagement with any one of the sides of the other pallets.

The central support is provided with material supporting and fastening means on both the top and bottom sides so that one type of article may be carried on one side and another type of article carried on the other side. As shown in FIGURE 5, in many industrial uses where, for instance, a large member is to be carried from one station to another, suitable fastening means may be utilized to secure the large member on the top surface of the central support frame. In such usage, it is a common occurrence to find that a plurality of small parts are to be returned to the same location from which the large member came and therefore a bin or box 64 may be fastened to the underside of the central support by suitable fastening means such as bolt members 65, so that in the reversed position shown in FIGURE 4, the bin opens upwardly. The bin may be integrally fastened to the bottom side or removably fastened as illustrated. Support brackets or other fastening means may be removably or permanently secured to the upper surface of the rack for particular applications if necessary. Thus diverse support means can be permanently fixed to the upper and lower surfaces of the rack and the rack will still be capable of utilization for two way traffic of diverse materials.

In operation, a particular work material may be loaded on one side of the central frame member and carried on the rack by a fork truck which can approach the rack from any side. The fork truck tunnels are formed so that regardless of which side supports material, the tunnels remain clear and there is no interference with the supported materials. When the rack is transported to the next station it may be stacked with similar racks for convenient, economical storage. If materials of a different nature are to be returned from the same station to which the original material was delivered, the rack may be turned over and the different materials secured thereto for transportation back to the original station or to another station. Thus, even though special apparatus is provided on the rack to accommodate a particular material, the rack is capable of other uses by provision of different carrying means on the other side of the central frame member so that the rack may be used to carry materials both in traveling to and from a work station. The special stacking feature of having oppositely arranged lugs and notches on adjacent ends of the support legs permits the racks to be stacked regardless of which side of the central frame is being utilized at a particular time, and the part of the stacking interlock that is subject to wear from sliding action on factory floors or from contact with other racks is provided with a skid or wear plate which suitably protects the stacking lugs.

This invention is intended to encompass changes and modifications in the structure and arrangement of the parts within the spirit of the invention as defined by the appended claims.

We claim:

1. A dual purpose shipping rack for handling, transporting and storing diverse industrial materials comprising, a horizontal frame, vertically extending posts affixed to said frame, stacking means provided on opposite ends of each said post for random stacking of a plurality of said racks, said frame being supported intermediate the ends of said posts, the top of said frame member being provided with means to carry an industrial material, and the bottom of said frame member supporting different container means to carry a different kind of industrial material.

2. A dual purpose shipping rack for handling, transporting and storing industrial materials comprising, a horizontal frame, vertically extending support posts affixed to said horizontal frame, stacking means provided on opposite ends of each said post for random stacking of a plurality of said racks, said posts extending above and below said frame member and forming frame supporting legs on both sides of said horizontal frame, support means on one side of said frame adapted for handling, transporting and storing bulky industrial material, and box-like container means provided on the other side of said horizontal frame adapted to carry a plurality of different sized industrial material when shifted into carrying position.

3. An apparatus for handling, transporting and storing industrial materials in association with industrial lift trucks, comprising a frame member, said frame member including a rim portion, tunnel forming cross supports forming part of said frame member and opening about the periphery of said rim at at least four areas, each of said areas being spaced 90° from adjacent areas, said tunnels being spaced to accommodate the lifting mechanism of said industrial trucks, a plurality of post members connected to said frame member and extending above and below said frame to provide support legs at each end thereof for reversely supporting said frame at either end of said support legs; and similar stacking means provided on both ends of each of said post members whereby said apparatus may be stacked with similar apparatus for storage.

4. The apparatus as defined in claim 3 and having industrial material support means associated with one side of said frame for an industrial material, and having different industrial material support means associated with the other side of said frame to support a different industrial material.

5. The apparatus as defined in claim 3 and comprising stacking lugs and notches on each end of said post, opposite ends of said posts having reversely positioned lugs and notches, and adjacent posts having the notches and lugs in corresponding ends thereof reversely positioned to provide for random indiscriminate stacking of said apparatus.

6. The apparatus as defined in claim 3 and having skid means associated with each of said support legs on each of said post members.

7. A material handling device comprising a central body portion, spaced lift arm accommodating tunnels formed in said body portion, said tunnels extending to and opening at all side surfaces of said central body portion, a plurality of support members extending outwardly from the top and bottom surfaces of said central body portion, each of the end portions of said support members being provided with stacking means, each of said stacking means comprising spaced surfaces parallel to said central body portion, one of said surfaces being located a greater distance from said central body portion than another of said surfaces, a flat skid plate fixed to said one surface, the extremity of said skid plate being curved toward said central body portion, enclosure plates fixed to the side of each of said support members adjacent said inner surfaces to form support pockets, retaining means for a material associated with one side of said central body portion, and separate retaining means for a different material associated with the other side of said central body portion.

References Cited in the file of this patent

UNITED STATES PATENTS

| | | |
|---|---|---|
| 1,270,095 | Baehr | June 18, 1918 |
| 1,336,973 | Levene | Apr. 13, 1920 |
| 2,579,655 | Donald | Dec. 25, 1951 |
| 2,664,219 | Schmidt | Dec. 29, 1953 |
| 2,827,302 | Skyrud | Mar. 18, 1958 |
| 2,917,261 | Stough | Dec. 15, 1959 |